United States Patent
Yanagisawa et al.

(10) Patent No.: US 7,520,299 B2
(45) Date of Patent: Apr. 21, 2009

(54) VALVE STRUCTURE AND CONTROL TECHNIQUES

(75) Inventors: Masanari Yanagisawa, Kawasaki (JP); Iwane Inokuchi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 234 days.

(21) Appl. No.: 11/368,318

(22) Filed: Mar. 3, 2006

(65) Prior Publication Data

US 2006/0207669 A1    Sep. 21, 2006

(30) Foreign Application Priority Data

Mar. 4, 2005    (JP)    ............... 2005-060829

(51) Int. Cl.
*F16K 39/02*    (2006.01)

(52) U.S. Cl. .................. 137/630.14; 137/630.22; 251/117

(58) Field of Classification Search ............ 137/614.16, 137/630.14, 630.15, 630.22; 251/117
See application file for complete search history.

(56) References Cited

U.S. PATENT DOCUMENTS

| 628,671 | A | * | 7/1899 | Newman | ............... | 137/630.14 |
|---|---|---|---|---|---|---|
| 935,113 | A | * | 9/1909 | Judge | ............. | 251/117 |
| 969,803 | A | * | 9/1910 | Pollock | ............. | 137/630.22 |
| 1,020,535 | A | * | 3/1912 | Brenner | ............. | 137/630.14 |
| 2,417,217 | A | * | 3/1947 | Schreck | ............. | 251/117 |
| 3,128,792 | A | * | 4/1964 | Rule | ............. | 137/630.14 |
| 4,932,435 | A | * | 6/1990 | Stroze et al. | ......... | 137/614.16 |
| 6,899,969 | B2 | | 5/2005 | Kanno | | |

FOREIGN PATENT DOCUMENTS

JP    2004-162878    6/2004

* cited by examiner

*Primary Examiner*—John Fox
(74) *Attorney, Agent, or Firm*—Young Basile (57) ABSTRACT

A valve includes a valve body forming a first flow passage and a second flow passage that connects to the first flow passage through a first opening and a seating element forming a bypass passage that connects the first flow passage and the second flow passage. The bypass passage opening has a smaller cross-sectional area than the first opening. The valve also includes a valve control element that can be repositioned to open both the first opening and the second opening, open the second opening while closing the first opening or close both the first opening and the second opening. The bypass passage may allow fluid to drain through the valve to prevent fluid from building up in the valve. If fluid becomes frozen, the valve may become stuck shut. In some embodiments, the bypass passage opens only if the temperature creates a possibility of freezing in the valve.

11 Claims, 10 Drawing Sheets

VALVE STRUCTURE AND CONTROL TECHNIQUES

This application claims priority from Japanese Patent Application No. 2005-060829, filed Mar. 4, 2005, the entire contents of which is incorporated herein by reference.

TECHNICAL FIELD

The present invention relates to a valve structure.

BACKGROUND

Some valves that normally control a gas flow can collect water, e.g., from condensation. In some instances the valve may be immersed in water, e.g., if the valve is closed. If the ambient temperature is cold enough, a valve may become frozen and stuck in place.

One technique to prevent freezing in valves is to locate moveable valve elements above the portion of the valve body where water will first collect. Another technique is to limit contact area in a closed valve between a moveable part and a stationary portion of the valve such that the separation force, in the event the parts become frozen together, is relatively low. However, in the case where the valve body is filled with water, freezing can still cause the valve to become stuck in place.

SUMMARY

Embodiments of the invention include a valve for controlling flow rate installed on one of an anode line for supplying a fuel gas to a fuel cell or a cathode line for supplying an oxidizer gas to the fuel cell. The valve for controlling flow rate includes a hollow seating element forming a seating element flow passage and a piston element that opens and closes the opening of the seating element flow passage. When the valve is open, gas passes through the valve body flow passage, through the opening of the seating element flow passage and into the seating element flow passage.

The seating element also forms a bypass passage that connects the valve body flow passage and the seating element flow passage. The bypass passage allows fluid to drain through the valve to prevent fluid from building up in the valve. In some embodiments, the bypass passage opens only if the temperature creates a possibility of freezing in the valve. For example, the valve may include a temperature sensitive material that changes shape to open the bypass passage in freezing temperatures.

In one embodiment, a valve comprises a valve body, the valve body forming a first flow passage and a second flow passage that connects to a lower portion of the first flow passage through a first opening, a seating element within the valve body and between the first flow passage and the second flow passage, the seating element forming a bypass passage with a second opening that connects the first flow passage and the second flow passage, wherein the second opening has a smaller cross-sectional area than the first opening; and a valve control element that can be adjustably repositioned to each of, a first position to open the first opening and the second opening, a second position to open the second opening while closing the first opening, and a third position to close both the first opening and the second opening.

In another embodiment, the invention is directed to a system comprising a flow meter in a supply line for a fuel cell, a valve in the supply line that can be set to be open or closed according to a control signal, and a controller that sends the control signal to set the valve to the open position, receives a signal from the flow meter corresponding to a measured flow rate, and predicts a freezing state of the supply line based on the measured flow rate and the control signal.

In another embodiment, the invention is directed to a valve comprising a valve body that forms a valve body flow passage, a mechanism to open and close the valve, and a temperature sensitive material that changes shape to open the bypass passage if the temperature is at or below a defined temperature. The mechanism also forms a bypass passage that, when open, allows fluid to drain through the valve when the valve is closed The details of one or more embodiments of the invention are set forth in the accompanying drawings and the description below. Other features, objects, and advantages of the invention will be apparent from the description and drawings, and from the claims.

DETAILED DESCRIPTION

Figure 1:
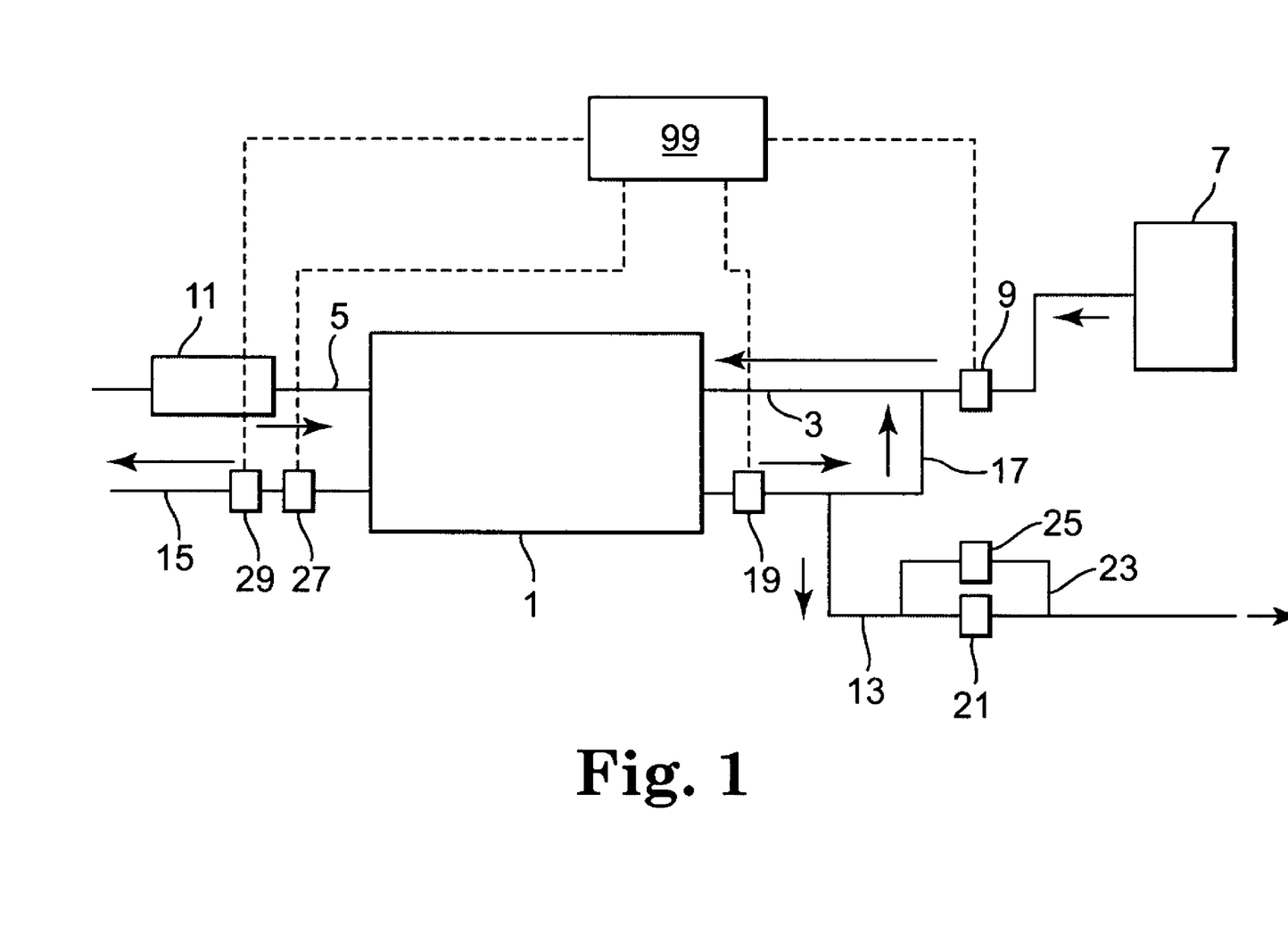
FIG. 1 is an overall block-diagram of a fuel cell system according to a first exemplary embodiment.

FIG. 1 is a block diagram of the fuel cell system according to the first exemplary embodiment. An anode entry line 3 that receives a supply of hydrogen and a cathode entry line 5 that receives a supply of air are connected to the fuel cell 1. Hydrogen as the fuel gas and oxygen as the oxidizer gas react in the fuel cell 1 to generate electricity.

On the anode entry line 3, a hydrogen tank 7 is provided at the upstream end, and a pressure regulating valve 9 is provided mid-way. A compressor 11 is installed on the cathode entry line 5.

In addition, the outlet lines 13 (anode off-gas) and 15 (cathode off-gas), through which hydrogen and air are discharged respectively, after the power generation, are connected to the fuel cell 1.

The anode outlet line 13 branches off to a hydrogen circulation line 17 and connects to the anode entry line 3 downstream of the pressure regulating valve 9. The anode outlet line 13 also circulates hydrogen with an ejector pump that is not shown in the figure.

The flow meter 19 detects the flow rate upstream from the connection with hydrogen circulation line 17 of the anode outlet line 13. In addition, the purge valve 21 controls the flow rate downstream from the connection with the hydrogen circulation line 17 of anode outlet line 13. Furthermore, a relief valve 25 is installed in the purge valve bypass passage 23 to bypass the purge valve 21.

The flow meter 27 detects a flow rate in the cathode outlet line 15. The pressure regulating valve 29 controls a flow rate in the cathode outlet line 15.

Controller 99 controls the pressure regulating valve 9 and the pressure regulating valve 29. Controller 99 also receives signals representing flow rates from the flow meter 27 and the flow meter 19. Controller 99 may also implement a thawing operation if the supply lines including the pressure regulating valve 9 and the pressure regulating valve 29 are in a below freezing state, e.g., by increasing the operation temperature of the fuel cell 1 or by turning on a heater (not shown).

Controller 99 and the functions thereof may be implemented by executing instructions within computer-readable medium with one or more processors, discrete hardware circuitry, firmware, software executing on a programmable processor, or combinations thereof. In this manner, controller 99 is not necessarily contained within a common housing, or as a single unit.

Figure 2:
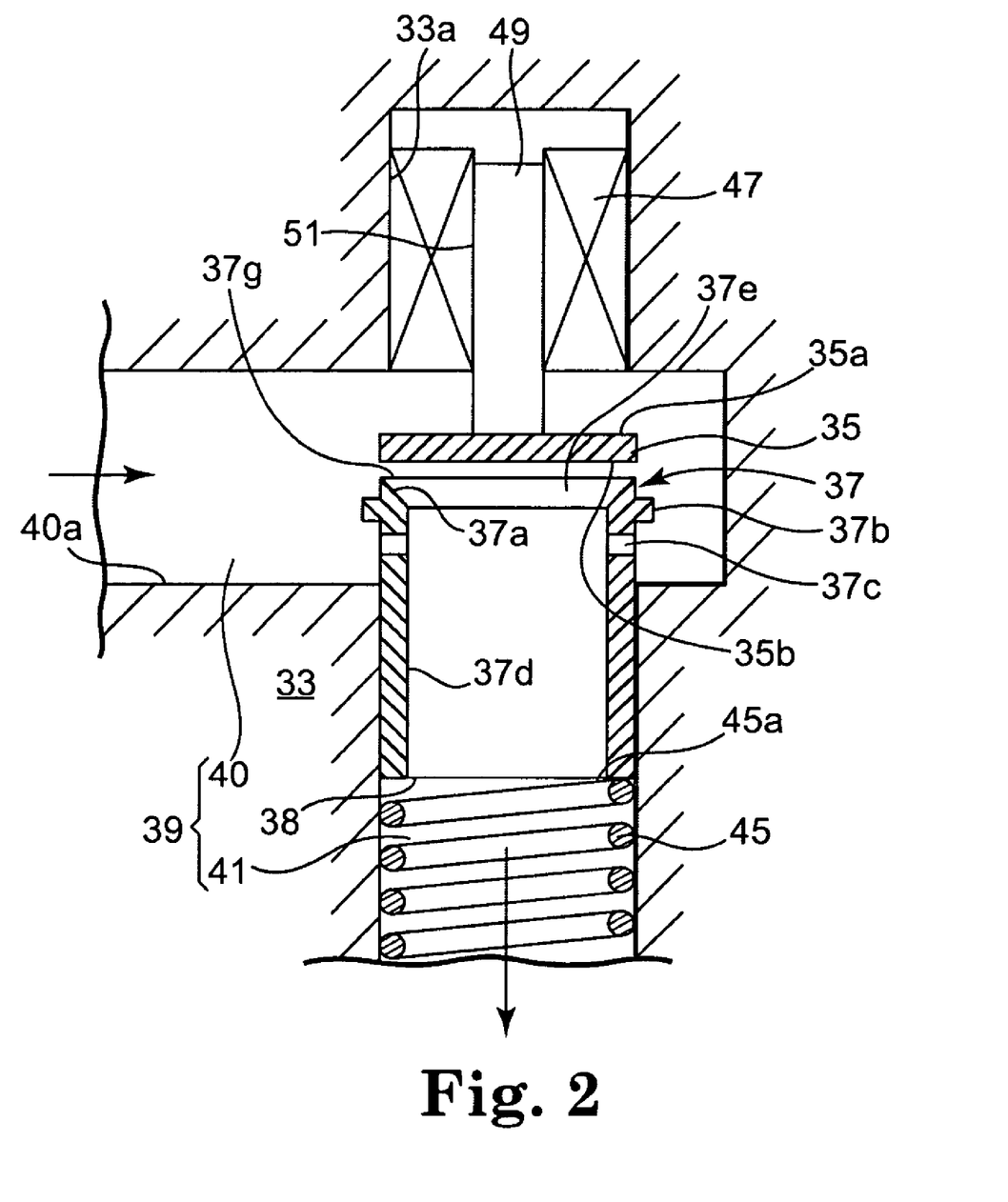
FIG. 2 is an enlarged cross-sectional view of an open valve in the fuel cell system of FIG. 1.

As a first exemplary embodiment, the structure of the fuel cell system includes a valve as shown in FIG. 2. The valve shown in FIG. 2 may be either the purge valve 21 on the anode outlet line 13 or the pressure regulating valve 29 on the cathode outlet line 15.

The valve body 33 is installed in the middle of the anode outlet line 13 or the cathode outlet line 15. A disk-shaped piston element 35, a valve control element and a cylindrical seating element 37 are within the valve body 33. The seating element flow passage 37d formed by the seating element 37 connects to a horizontal valve body flow passage 40, also called a first valve body flow passage and to a vertical valve body flow passage 41, also called a second valve body flow passage.

The seating element 37 is movable upward and downward within the vertical flow passage 41. The spring 45 is provided as an elastic supporting element, biasing the seating element 37 upwards between its lower end 38 and a spring support (not shown in FIG. 2), which protrudes from an interior wall of the vertical flow passage 41.

As shown in FIG. 2, the upper end of seating element 37 is biased upward by the spring 45. Seating element 37 protrudes into the horizontal valve body flow passage 40, and is located vertically higher than the bottom face 40a. The seating element 37 includes a taper surface 37a. A stopper 37b is a protrusion on seating element 37 that limits downward movement of the seating element 37. The stopper 37b prevents the seating element 37 from ever being lower than the bottom face 40a.

In addition, when the seating element 37 is pressed upward by the spring 45, an arrangement of bypass passages 37c below the stopper 37b open into the horizontal valve body flow passage 40.

A cavity 33a is formed on the upper valve body 33 of the seating element 37, and an electromagnetic coil 47 resides within the cavity 33a. A valve stem 49, connected to a top surface 35a of the piston element 35, resides within this electromagnetic coil 47. The coil 47, when energized, causes a sliding part 51 of the valve stem 49 to move upward or downward.

The electromagnetic coil 47 may optionally be capable of moving the valve stem 49 upward or downward depending on the position of the seating element 37, particularly in the situation where the seating element 37 is biased by the spring 45 to its top-most position (i.e. the state with the possibility of freezing). This can be realized by using a two-coil structure for electromagnetic coil 47 or by reversing the voltage across a single-coil structure.

Figure 3:
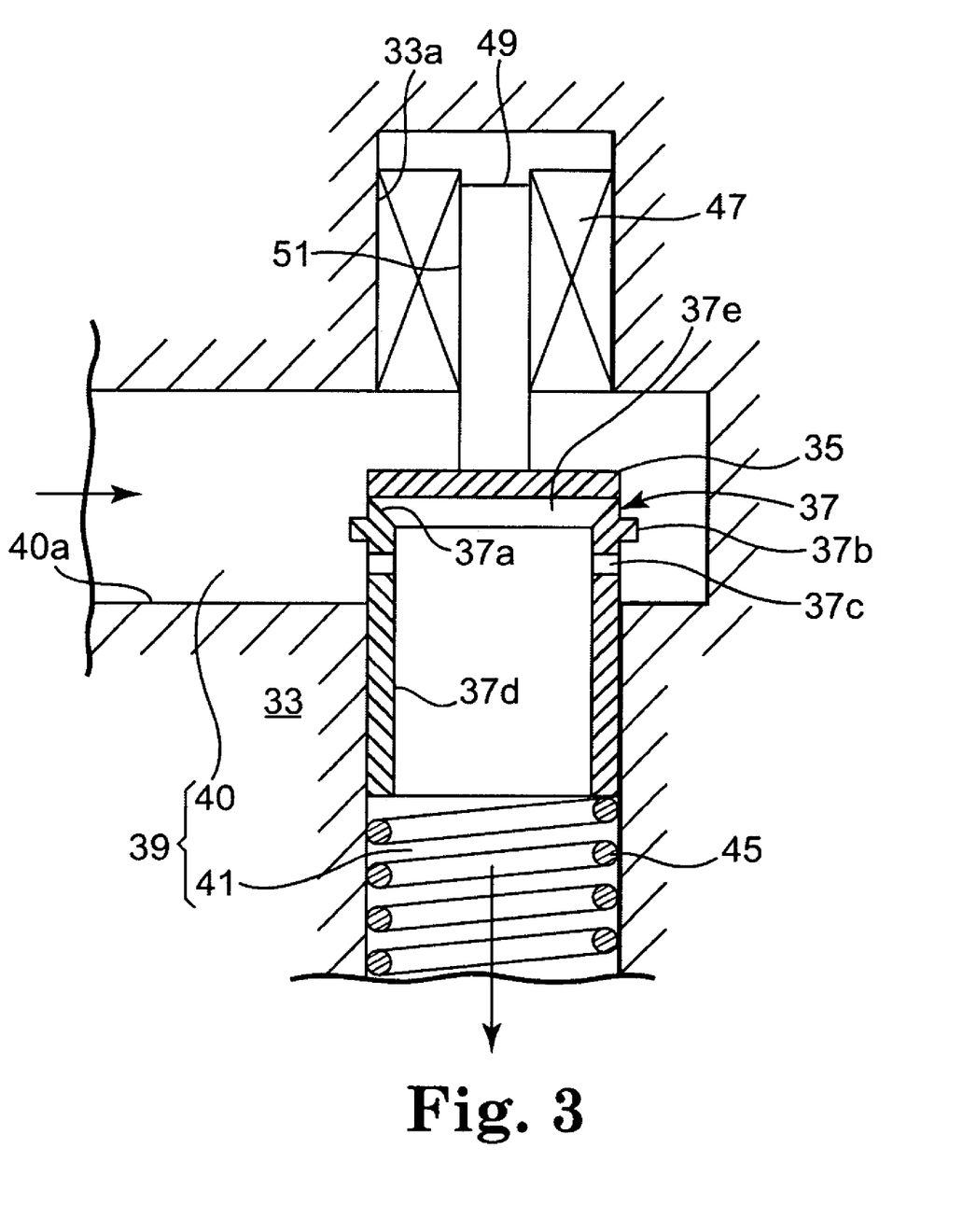
FIG. 3 is an enlarged cross-sectional view of a closed valve in the fuel cell system of FIG. 1.

In operation, the seating element 37 is pressed upwards by the spring 45, moving it to the top-most position to halt the fuel cell 1. At this point, the bypass passages 37c are opened into the horizontal valve body flow passage 40 and the lower portion 35b of the piston element 35 is seated on the upper end 37g of the seating element 37, closing the opening 37e in a first closed-valve position. Therefore, as shown in FIG. 3, even if water flows into the valve from the fuel cell 1 when the fuel cell 1 is halted, the water will drain downstream into the seating element flow passage 37d through the bypass passage 37c.

In a conventional valve, the valve body can become immersed in water. If the water freezes the valve can be stuck in solid ice. However, with the currently described embodiment, the top 37g of the seating element 37, where it contacts the lower portion 35b of the piston element 35, will not become immersed in water. If the ambient temperature falls below the freezing point after turning-off the fuel cell 1, the piston element 35 will not become frozen to the seating element 37.

As a result of freezing, the seating element 37, located at the top most vertical position, may get stuck with the valve body 33. Even in this case, the piston element 35 can be actuated upwards using the electromagnetic coil 47 to secure a valve stroke sufficient to make the flow rate control possible.

The leak rate from the fully closed valve when seating element 37 is located uppermost vertical position depends on the amount of liquid moving through the bypass passage 37c. However, the piston element 35 can be moved downward using the electromagnetic coil 47 to press the seating element 37 into the vertical flow passage 41 of the valve body 33. After separating it from the seating element 37 by thawing using power from the fuel cell 1, bypass passage 37c can be closed, namely at a second closed valve position, which reduces the leak rate from the fully closed-valve.

According to a second exemplary embodiment, the spring 45 in the first exemplary embodiment shown in FIG. 2 can change its free length 45a in response to variations in temperature. The free length 45a of the spring 45 changes in response to temperature variations, e.g., by using shape-memory alloys or bimetals. For example, when the ambient temperature drops below a predetermined temperature, the free length 45a of the spring 45 increases and presses against the seating element 37, which causes the seating element 37 to move to the position shown in FIG. 2. Thus, the bypass passage 37c opens into the horizontal valve body flow passage 40. For example, the predetermined temperature may correspond to a maximum temperature at which the valve may freeze. Because of this, as shown in FIG. 3, even if water flows into the valve from fuel cell 1 even when fuel cell 1 is not operating, i.e., when the valve is closed, the water flows through the bypass passage 37c and continues downstream. Thus, the top of seating element 37, which houses the piston element 35, is not immersed.

If the ambient temperature exceeds the predetermined temperature, the spring 45 shrinks from its state shown in FIG. 2, the seating element 37 moves downward, and the stopper 37b abuts with the bottom face 40a of the horizontal valve body flow passage 40. Thus, the bypass passage 37c is closed by moving the seating element 37 into the vertical flow passage 41. Therefore, in this case, it is not necessary to press the seating element 37 into the vertical flow passage 41 by actuating the piston element 35 using the electromagnetic coil 47 from the state shown in FIG. 3.

According to a third exemplary embodiment the temperature characteristics of the spring 45 in the second exemplary embodiment whose free length 45a changes in response to the ambient temperature, is set such that its free length 45a is elongated enough to open the bypass passage 37c into the horizontal valve body flow passage 40 just before the valve freezes.

Figure 4:
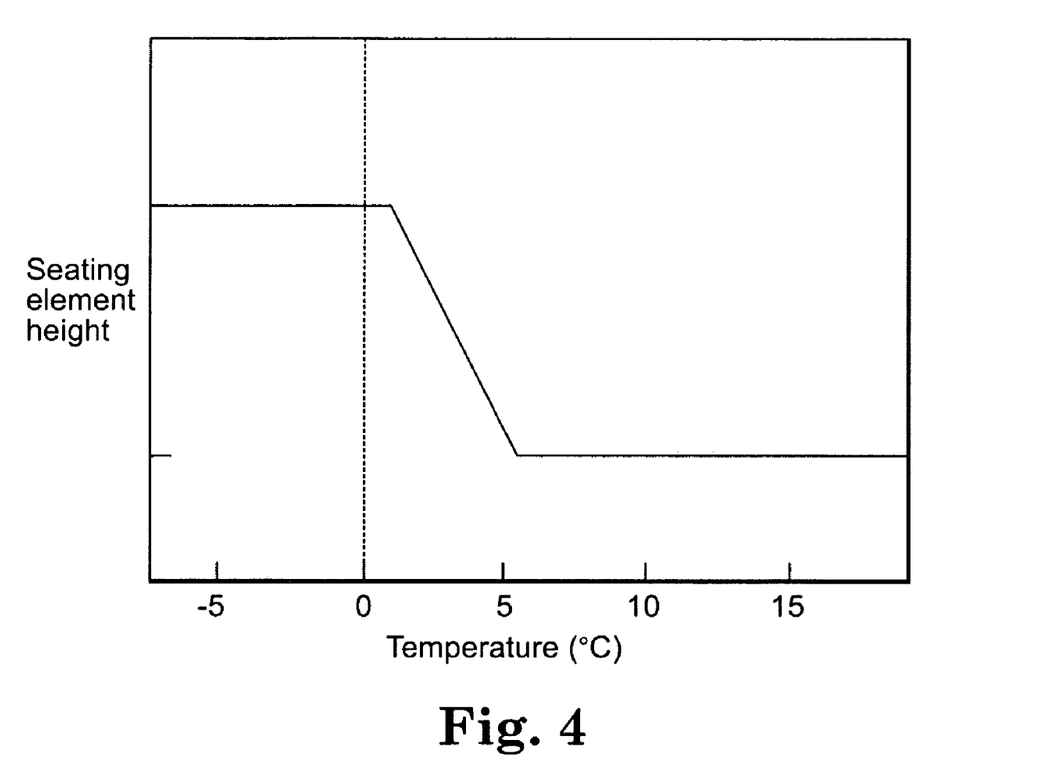
FIG. 4 is a chart of seating element height relative to temperature in a valve according to a third exemplary embodiment.

FIG. 4 shows the height characteristics of the seating element 37 corresponding to the temperature characteristics of the spring 45 in the third exemplary embodiment. When the ambient temperature decreases to around 5° C., the free length 45a of the spring 45 starts to elongate. The height of the seating element 37 is maximized just before the freezing temperature of 0° C., which is the range from 1° C. to 2° C. The seating element 37 can be pressed up just before freezing occurs, opening the bypass passage 37c into the in-valve body flow passage 39. This prevents the freezing of the piston element 35 and the seating element 37.

In addition, at temperatures above the freezing range, the spring 45 shrinks due to its characteristics to close the bypass passage 37c by allowing the seating element 37 to enter into the vertical flow passage 41. Therefore, in this case, it is not necessary to press the seating element 37 into the vertical flow passage 41 by actuating the piston element 35 using the electromagnetic coil 47 from the state shown in FIG. 3 to close the bypass passage.

Figure 5:
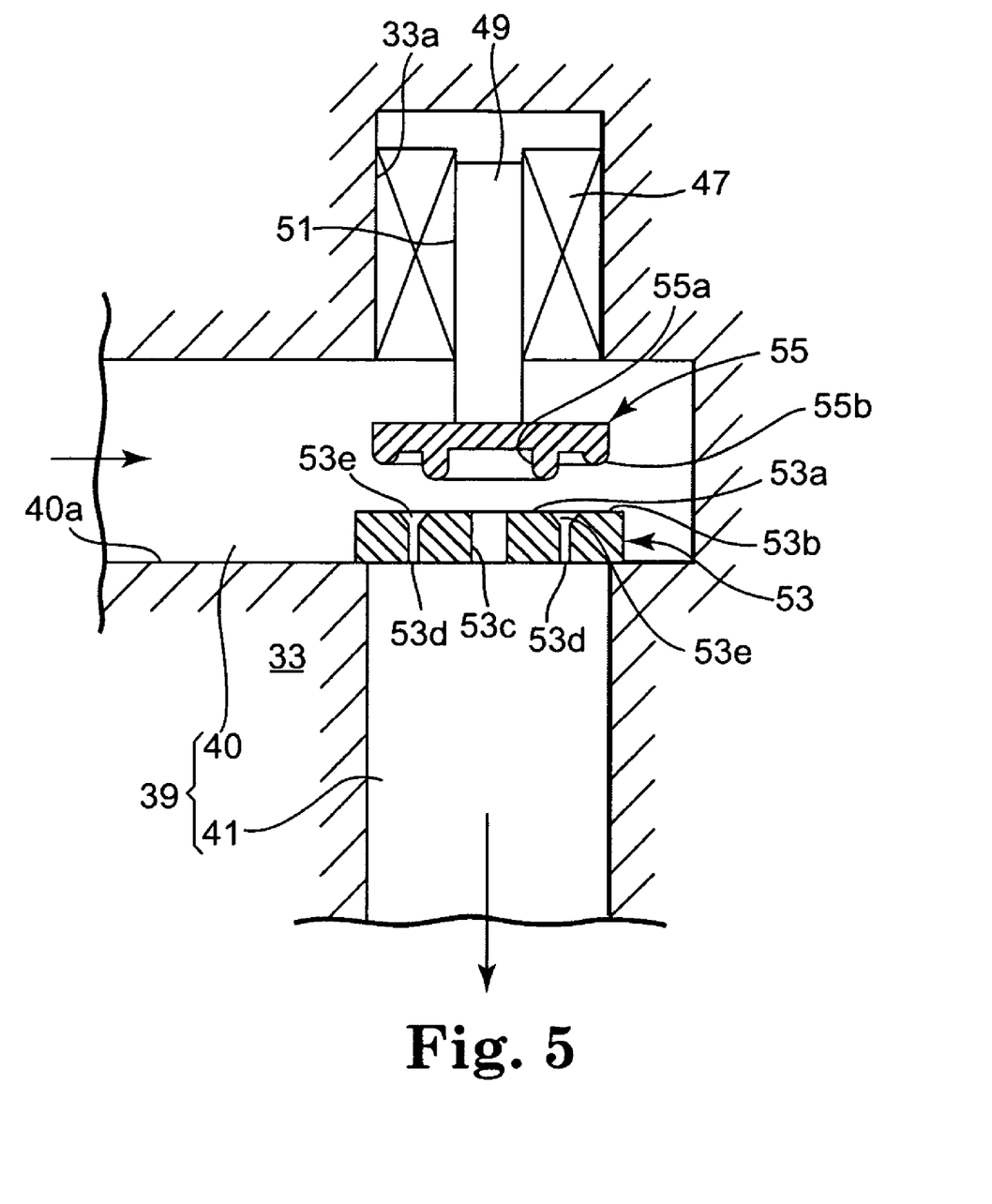
FIG. 5 is an enlarged cross-sectional view of an open valve in a fourth exemplary embodiment.

FIG. 5 is a cross-sectional view corresponding to FIG. 2, showing a fourth exemplary embodiment. According to this embodiment, a valve seating element 53 is installed and fixed on the opening to the horizontal valve body flow passage 40 of the vertical flow passage 41 in the valve body 33. The valve seating element 53 includes two parts: a first portion of the seating element 53a positioned near the center of the vertical flow passage 41, and a second portion of the seating element 53b is positioned around the first portion of the seating element 53a. As shown, the first portion of the seating element 53a and the second portion of the seating element 53b have the same vertical height and position. In other embodiments, the height of the first portion of the seating element 53a may be greater than the height of the second portion of the seating element 53b.

An inside passage 53c, which is a seating element flow passage provided at the center of the first portion of the seating element 53a, connects the horizontal valve body flow passage 40 and the vertical flow passage 41 of the in-valve body flow passage 39 though a first opening. A number of bypass passages 53d, which are seating element flow passages provided between the first portion of the seating element 53a and the second portion of the seating element 53b, also connect the horizontal valve body flow passage 40 and the vertical flow passage 41 of the in-valve body flow passage 39 though separate openings. In addition, an opening 53e towards the horizontal valve body flow passage 40 of the bypass passage 53d may be used to increase the cross-sectional area of the flow passage.

An elastically deformable ring-shaped first protrusion 55a is provided on an under surface of the piston element 55, and is seated on the first portion of the seating element 53a. A ring-shaped second protrusion 55b is provided on the under surface of the piston element 55, at the outside of the first protrusion 55a, and is seated on the second portion of the seating element 53b.

The first protrusion 55a extends further downward than the second protrusion 55b, so when the piston element 55 descends, the first protrusion 55a seats on the first portion of the seating element 53a before the second protrusion 55b seats on the second portion of the seating element 53b. After seating on the first portion of the seating element 53a, the first protrusion 55a is elastically deformed as piston element 55 extends to seat the second protrusion 55b on the second portion of the seating element 53b.

The second protrusion 55b is not seated on the second portion of the seating element 53b at the moment when the first protrusion 55a is first seated on the first portion of the seating element 53a. Because of this, the water flowing through the horizontal valve body flow passage 40 of the in-valve body flow passage 39 flows into vertical flow passage 41 through the bypass passage 53d.

According to the valve of the fourth exemplary embodiment, in the normal operation of fuel cell 1, the piston element 55 moves up and down to control flow. To fully close the valve, the electromagnetic coil 47 operates to further actuate the piston element 55 to elastically deform the first protrusion 55a after it is seated on the first portion of the seating element 53a, so that the second protrusion 55b is seated on the second portion of the seating element 53b. Thus, no leakage is allowed when the valve is fully closed, since both the inside passage 53c and the bypass passage 53d are blocked.

In addition, when the possibility of freezing is present after turning-off the fuel cell 1, for example, the electromagnetic coil 47 actuates the piston element 55 to seat the first protrusion 55a on the first portion of the seating element 53a and to prevent the second protrusion 55b from being fully seated by leaving a space between the second protrusion 55b and the second portion of the seating element 53b.

The movement of the piston element 55 to elastically deform the first protrusion 55a, or not to elastically deform it, can be realized by providing a twin coil arrangement in the electromagnetic coil 47 or by reversing voltage through a single coil.

When a space between the second protrusion 55b and the second portion of the seating element 53b exists, the bypass passage 53d is open. Thus, when the water around the seating element 53 rises to the height of an upper surface of the second portion of the seating element 53b, it drains through the bypass passage 53d and enters the vertical flow passage 41. This prevents the first protrusion 55a and the first portion of the seating element 53a from freezing and adhering together.

Figure 6:
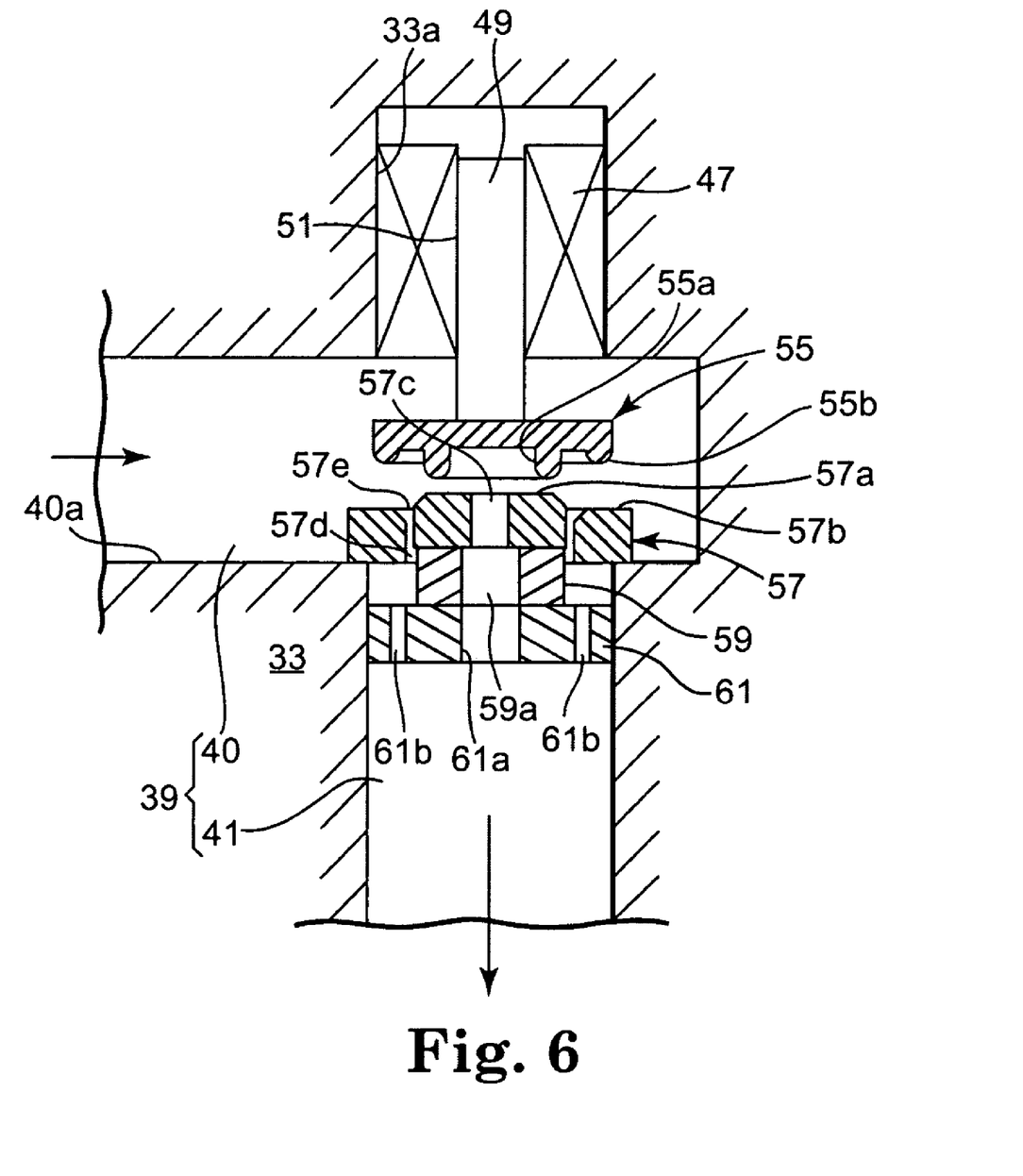
FIG. 6 is an enlarged cross-sectional view of an open valve in a fifth exemplary embodiment.

FIG. 6 is a cross-sectional view corresponding to FIG. 2, showing a fifth exemplary embodiment. This embodiment is a deformation example of the fourth exemplary embodiment shown in FIG. 5. Here, a valve seating element 57 includes a first portion of the seating element 57a in the center, and a second portion of the seating element 57b around it. In this embodiment, the first portion of the seating element 57a and the second portion of the seating element 57b are separate parts.

An inside passage 57c, which is a seating element flow passage provided in the center of the first portion of the seating element 57a, connects the horizontal valve body flow passage 40 and the vertical flow passage 41. A ring-shaped bypass passage 57d, which is provided between the first portion of the seating element 57a and the second portion of the seating element 57b, connects the horizontal valve body flow passage 40 and the vertical flow passage 41. In addition, an opening 57e toward the horizontal valve body flow passage 40 of the bypass passage 57d increases the cross-sectional area of the flow passage.

The second portion of the seating element 57b is installed and fixed on the opening between the horizontal valve body flow passage 40 and the vertical flow passage 41. The first portion of the seating element 57a is supported on a thermo-wax 59 that changes its vertical length in response to temperature. As a cylindrical temperature-sensitive material, thermo-wax 59 is fixed on a disk-shaped thermo-wax holder 61 such that its outer peripheral surface is fixed to the inner wall of the vertical flow passage 41.

Thermo-wax 59 elongates upwards when there is a possibility of freezing at low temperatures. Thus, as shown in FIG. 6, it raises the first portion of the seating element 57a upwards so that it is located higher than the second portion of the seating element 57b.

Thermo-wax 59 and a thermo-wax holder 61 include through-holes 59a and 61a, which are matched with the inside passage 57c of the first portion of the seating element 57a, and connected to the vertical flow passage 41 at the center. In addition, in the thermo-wax holder 61, a number of bypass passages 61b, located outside of the thermo-wax 59, are provided to connect the upper and the lower flow, bounded by the thermo-wax holder 61. The bypass passages 61b and the bypass passages 57d can be connected with one another.

When the fuel cell 1 is turned-off, the first protrusion 55a on the piston 55 seats itself on the first portion of the seating element 57a. If there is a possibility of freezing due to low temperatures, as shown in FIG. 6, the thermo-wax 59 elongates upwards to raise the first portion of the seating element 57a to a position higher than the second portion of the seating element 57b. Thus the water flowing into the areas around the valve is drained downstream of the valve through the bypass passage 57d and the bypass passage 61b of thermo-wax holder 61. This prevents the first portion of the seating element 57a and the first protrusion 55a from freezing together, and the piston element 55 remains operable.

During operation of the fuel cell 1, when temperature increases, the thermo-wax 59 shrinks downward. This causes the first portion of the seating element 57a to descend to a position lower than the second portion of the seating element 57b. As a result, to provide flow control, the electromagnetic coil 47 operates to move the piston element 55 vertically. Since the valve is fully closed when the second protrusion 55b is seated on the second portion of the seating element 57b, leaks are prevented in the fully-closed valve.

In contrast to the fourth exemplary embodiment of FIG. 5, it is not necessary to make the first protrusion 55a with an elastic material because it does not have to be elastically deformed during closing.

Figure 7:
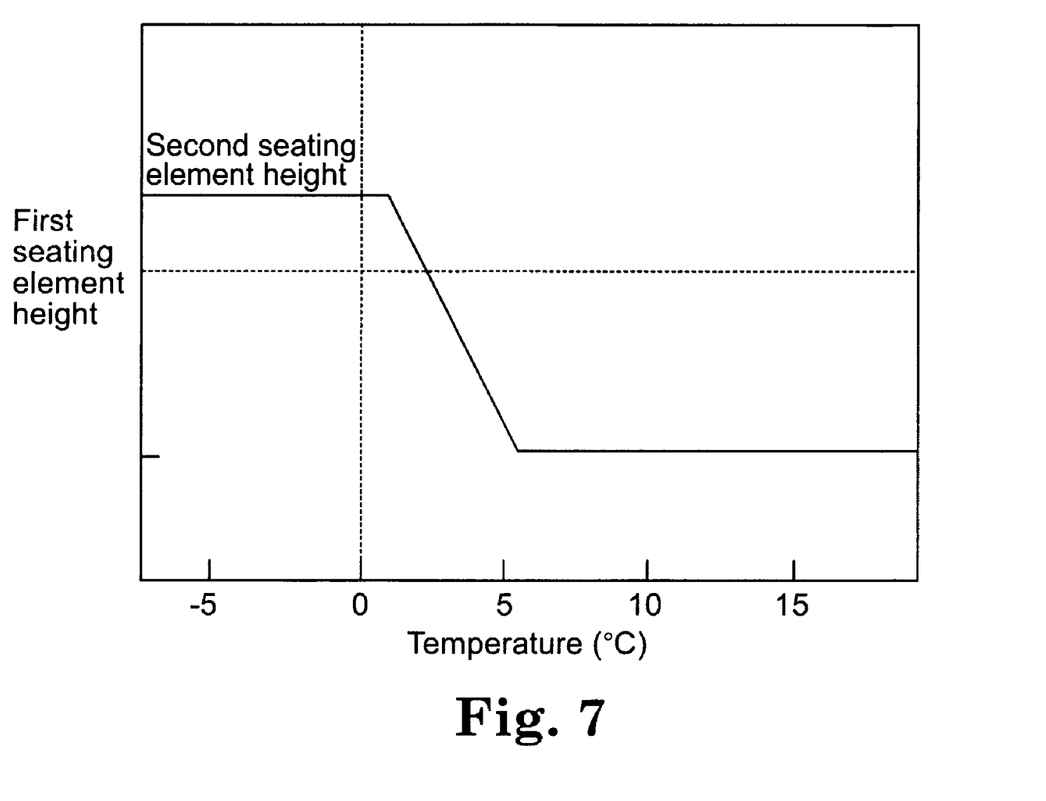
FIG. 7 is a chart of the first portion of the seating element height relative to temperature in a valve according to the fifth exemplary embodiment.

FIG. 7 shows the height characteristics of the first portion of the seating element 57a corresponding to the temperature characteristics of the thermo-wax 59. When the ambient temperature decreases to around 5° C., the thermo-wax 59 starts to elongate, which raises the first portion of the seating element 57a. In the range 2° C. to 3° C., it is located higher than the second portion of the seating element 57b. The height of the first portion of the seating element 57a is maximized just before the freezing temperature of 0° C., which is the range from 1° C. to 2° C.

Figure 8:
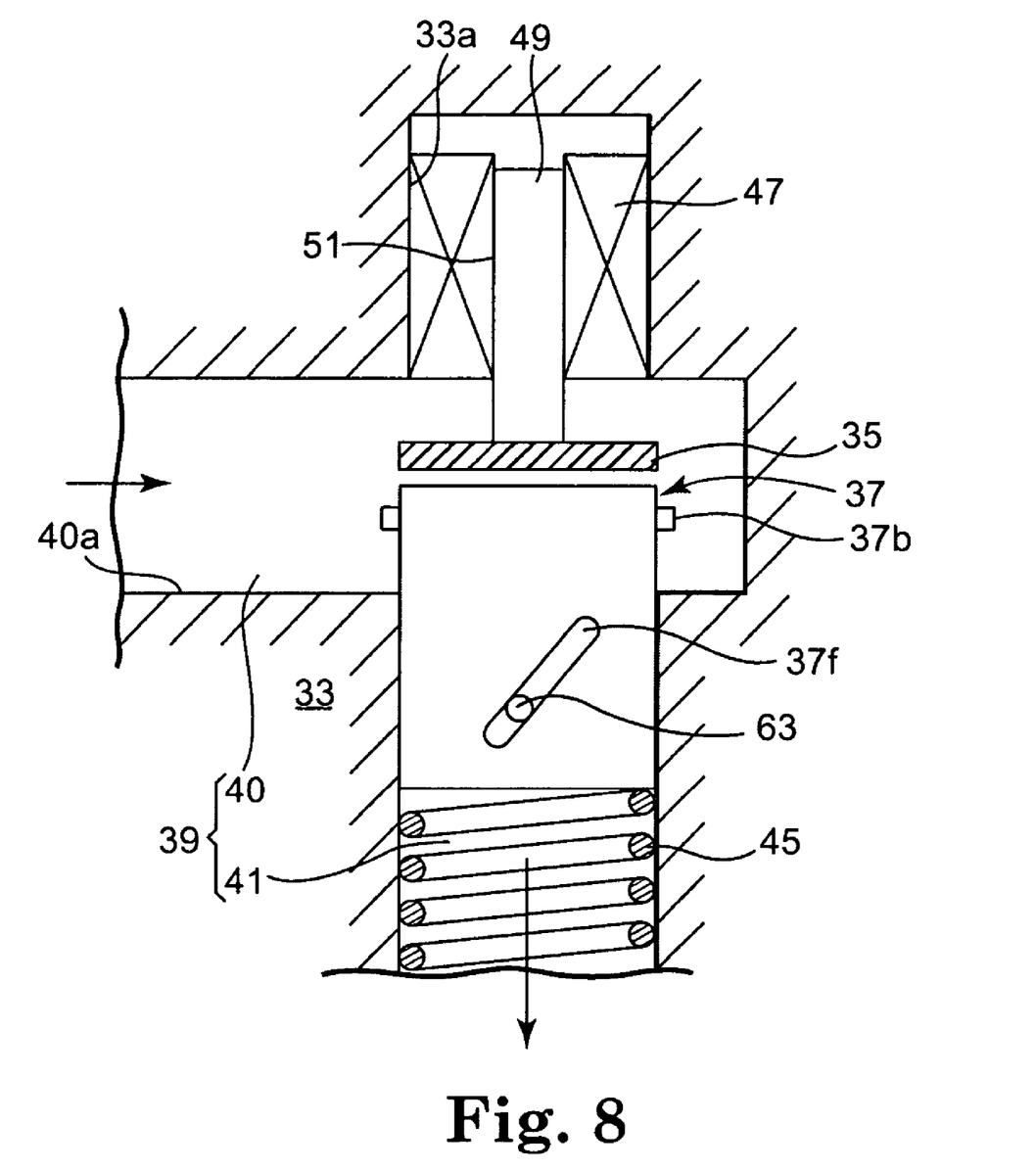
FIG. 8 is an enlarged cross-sectional view of an open valve in a sixth exemplary embodiment.

FIG. 8 is a cross-sectional view of the valve according to a sixth exemplary embodiment. As compared to the first exemplary embodiment shown in FIG. 2, this embodiment provides a spiral guide groove 37f on an outer peripheral surface of the seating element 37. A guide pin 63, whose front end is inserted in and moves along the guide groove 37f, is fixed on an inner surface of the vertical flow passage 41 of the valve body 33. The corresponding configuration is similar to the first exemplary embodiment.

In normal operation of the fuel cell 1, the seating element 37 is located at an uppermost position, biased by the spring 45. It is actuated towards the vertical flow passage 41 along with the descending piston element 35 by operating the electromagnetic coil 47. During this process, the seating element 37 rotates with respect to the valve body 33 because the guide pin 63 has moved in relation to the guide groove 37f. Thus the piston element 35, which presses against the seating element 37, is also rotated.

Since the valve stem 49 is also rotated along with the up and down motion due to rotation of the piston element 35, it can expel any foreign particles deposited in the sliding part 51 of the valve stem 49. This helps to reduce the maintenance and repair of the valve stem 49, and prevent the improper operation of the piston element 35, without employing methods such as providing filters finer than the clearance in the valve sliding part 51, or providing a diaphragm for foreign materials prevention at the inlet of the valve sliding part 51.

In contrast, using a filter may increase the pressure drop and cause the system to become imbalanced when the filter freezes at very low temperatures. In addition, a diaphragm is subjected to added pressure due to the pressure differential between the working pressure and the atmospheric pressure acting on the valve, which may require strengthening of the electromagnet by, e.g., increasing the actuation voltage and current.

According to a seventh exemplary embodiment, referring again to FIG. 1, the fluid flow rate may be measured on the hydrogen side by the flow rate measuring device 19 of the anode outlet line 13, in which the purge valve 21 is installed, or on the air side by the flow rate measuring device 27 of the cathode outlet line 15, in which the pressure regulating valve 29 is installed.

When the ambient temperature decreases to a predetermined temperature resulting in a possibility of freezing, the seating element 37 shown in FIG. 2 is raised by the elongation of the free length 45a of the spring 45. Again, when the ambient temperature increases above the defined temperature, the seating element 37 descends by the amount of shrinkage of the free length 45a of the spring 45. Therefore, even if the valve opening control signal is the same, the flow rate is different between the freezing and nonfreezing times because the upward pressure exerted by the seating element 37 against the piston element 35 is different.

Figure 9:
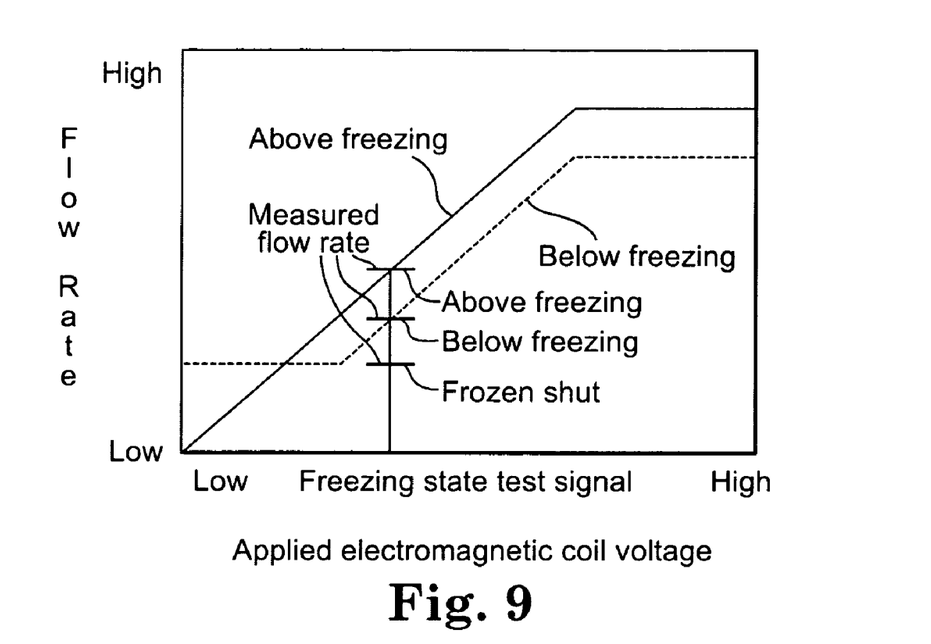
FIG. 9 is a chart of the applied electromagnetic coil voltage and flow rates for above and below freezing states in a seventh exemplary embodiment.

FIG. 9 shows the relationship between the valve opening control signal and the flow rate in the freezing time (dashed line) and nonfreezing time (solid line). When the ambient temperature is below freezing, the flow rate is greater than during nonfreezing ambient temperatures when the valve is closed. This is because of the leak rate from the bypass passage 37c around the fully closed the valve when the temperatures are below freezing. However, as the piston element 35 is raised when the temperatures are above freezing, the flow rate is greater than when below freezing since the seating element 37 is located at a lower position within the passage 41.

According to the seventh exemplary embodiment, the freezing state is determined by measuring the flow rate, for example, at a valve opening control signal V (freezing-state test signal) soon after a cold start. Using these techniques, timing to switch from a thawing operation to a normal operation can be predicted without using a temperature sensor. In addition to simplifying fuel cell system design, heat transfer delays and other inaccuracies of a temperature sensor are avoided.

With a cold start of the fuel cell 1, the seventh exemplary embodiment evaluates the freezing state of the liquid in the line around the seating element 37. The freezing state of the valve is determined by measuring flow rate at the hydrogen side flow rate measuring device 19 or the air side flow rate measuring device 27, at a defined freezing-state test signal defining an applied voltage to the electromagnetic coil 47. Depending on the measured flow rate, the system determines if the temperature of the valve is above freezing, below freezing or even if the piston is stuck to the seating element (frozen shut). According to this determination, the system then implements an appropriate thawing operation. In some embodiments, during or after the thawing operation, the flow rate may be measured again to again determine the freezing-state of the valve. For example, a thawing operation may be implemented until the flow rate increases to indicate the valve temperature is above freezing.

According to the eighth exemplary embodiment, the fluid flow rate is measured in the hydrogen side by the flow rate measuring device 19 of the anode outlet line 13, in which the purge valve 21 is installed, or on the air side by the flow rate measuring device 27 of the cathode outlet line 15, in which the pressure regulating valve 29 is installed.

Just before freezing occurs in the line around the seating element 37, it is raised by the amount by which the free length of the spring 45 is elongated. When there is no freezing, and during normal operation (operation after warm-up), the seating element 37 is lowered by the amount in which the free length of the spring 45 has shrunk. Therefore, even if the valve opening control signal is the same, the flow rate is different between in time just before freezing and after warm-up because of the difference in the upward pressure exerted by the seating element 37.

Figure 10:
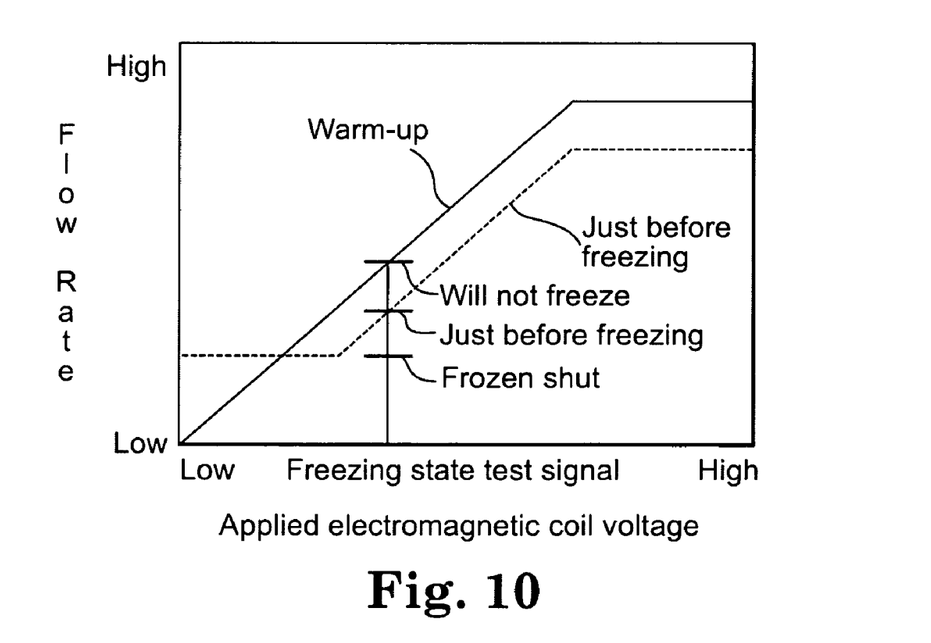
FIG. 10 is a chart of the applied electromagnetic coil voltage and flow rates just before freezing and after warm-up in an eighth exemplary embodiment.

FIG. 10 shows the relationship between the valve opening control signal and the flow rate just before freezing (dashed line) and after warm-up (solid line) used by controller 99 in an embodiment. As for the characteristics just before freezing, the flow rate is larger than after warm-up due to the leak rate from the bypass passage 37c around the fully closed valve. However, as the opening becomes larger after warm-up, the flow rate will become larger since the seating element 37 is located at a lower position along the passage 41. detected value of the hydrogen side flow rate measuring device 19 (or the air side flow rate measuring device 27) and the value of the valve control opening signal.

The state just before freezing or the continuing state after a warm-up can be judged from such flow characteristics by measuring the flow rate, for example, at a valve opening control signal V, e.g., a signal to partially open the valve, soon after a cold start. Using this evaluation method, the timing to switch from a normal operation to a thawing operation, such as increasing the operation temperature of the fuel cell or turning on a heater (not shown), the controller 99 predicts the freezing state around the seating element 37 without using a temperature sensor. Such a thawing operation may be used to change the freezing state of the system to above freezing from below freezing or to maintain an above freezing state of the system.

After warm-up the fuel cell 1, the controller 99 predicts and evaluates whether the inside of the line around seating element 37 is frozen. This is determined on the basis of a detected value of the hydrogen side flow rate measuring device 19 (or the air side flow rate measuring device 27) and the value of the valve control opening signal.

Figure 11:
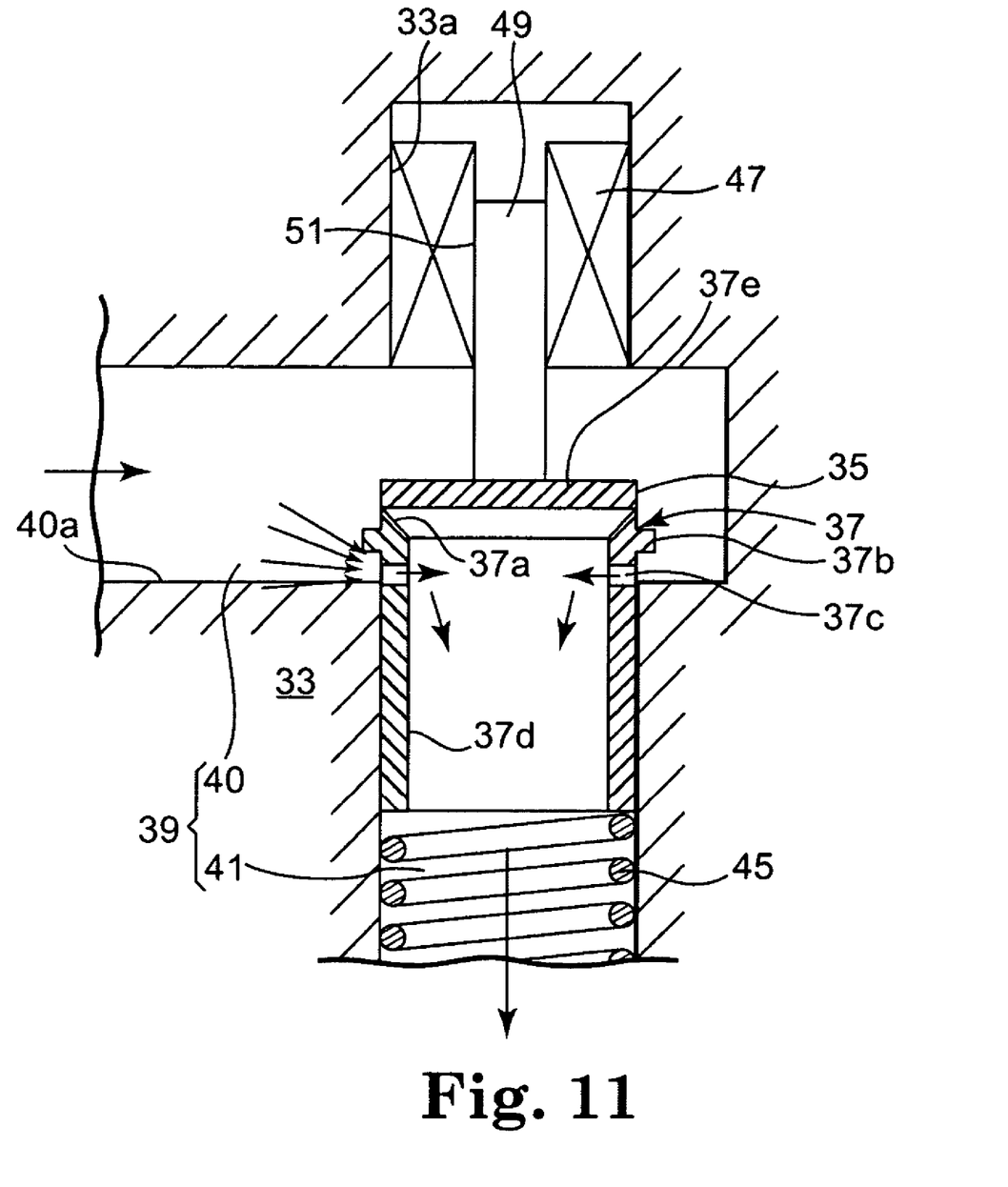
FIG. 11 is an enlarged cross-sectional view of a closed valve with open bypass passages in a ninth exemplary embodiment.

According to a ninth exemplary embodiment, if the controller 99 predicts in the eighth exemplary embodiment shown in FIG. 10 that the inside of the line around the seating element 37 is frozen, as shown in FIG. 11, then the controller 99 applies a current to the electromagnetic coil 47 as a thawing operation to heat the valve and reduce the risk of freezing. Again, the flow velocity adjacent to the inlet of the bypass passage 37c is accelerated, and the water around the valve is actively drained to downstream of the valve by the force of this accelerated fluid. The freezing risk for the valve is reduced.

The operation by the ninth exemplary embodiment can be applied to the valve by the fifth and sixth exemplary embodiments as shown in FIG. 5 and FIG. 6 respectively. If it is predicted that the inside of the line around the seating element 37 is frozen, then the control fluid can be drained to outside the passage 53d and 57d by seating the first protrusion 55a of the piston element 55 on the first portion of the seating element 53a and 57a when the controller 99 applies current to the electromagnetic coil 47.

Various embodiments of the invention have been described. However, variations to the described embodiments may be made within the spirit of the invention. For example, the invention is described with respect to a valve in a fuel cell outlet line. However, the described techniques may be utilized in a valve that resists freezing in other applications as well. These and other embodiments are within the scope of the following claims.

The invention claimed is:

1. A valve comprising:
   a valve body, the valve body forming a first flow passage and a second flow passage that connects to a lower portion of the first flow passage through a first opening, a seating element within the valve body and between the first flow passage and the second flow passage, the seating element forming a bypass passage with a second opening that connects the first flow passage and the second flow passage, wherein the second opening has a smaller cross-sectional area than the first opening; and
   a valve control element that can be adjustably repositioned to each of, a first position to open the first opening and the second opening, a second position to open the second opening while closing the first opening, and a third position to close both the first opening and the second opening; and
   an elastic supporting element within the second flow passage and below the seating element that biases the seating element towards the first valve body flow passage.

2. The valve of claim 1, wherein the valve control element is a piston element.

3. The valve of claim 2, wherein the piston element actuates vertically to move between the first, the second and the third positions.

4. The valve of claim 1, wherein the bypass passage moves below the lower portion of the first flow passage to close the bypass passage when the valve control element presses the upper end of the seating element against the elasticity of the elastic supporting element.

5. The valve of claim 1, wherein the free length of the elastic supporting element changes in response to temperature.

6. The valve of claim 5, wherein the free length of the elastic supporting element increases when there is a possibility of freezing to lift the seating element to increase the distance between the opening of the seating element and the lower portion of the first flow passage.

7. The valve of claim 5, wherein the free length of the elastic supporting element decreases when there is no possibility of freezing such that the bypass passage closes by moving below the lower portion of the first flow passage.

8. The valve of claim 1, wherein the seating element includes a protrusion to limit downward movement of the seating element.

9. The valve of claim 1, wherein the upper end of the seating element is higher than a bottom face of the first flow passage.

10. The valve of claim 1, wherein the first flow passage is a horizontal flow passage and the second flow passage is a vertical flow passage.

11. A fuel cell system comprising:
  a fuel cell including a cathode and an anode;
  an oxidant gas supply line which supplies an oxidant gas to the cathode;
  a cathode discharge line which discharges oxidant gas from the fuel cell;
  a fuel gas supply line which supplies fuel gas to the anode;
  an anode discharge line which discharges fuel gas from the fuel cell; and
  the valve of claim 1 located in either the anode discharge line or the cathode discharge line.

* * * * *